United States Patent
Avramidis et al.

(12) 
(10) Patent No.: US 6,364,800 B1
(45) Date of Patent: Apr. 2, 2002

(54) INTERIOR GUIDED CHAIN SYSTEM FOR LATERAL CHAIN CONTROL

(75) Inventors: Stellios A. Avramidis, Naples, FL (US); H. John Fraboni, Freeville, NY (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/391,656

(22) Filed: Sep. 7, 1999

Related U.S. Application Data

(60) Provisional application No. 60/101,262, filed on Sep. 21, 1998.

(51) Int. Cl.[7] .................................................. F16G 13/04
(52) U.S. Cl. ........................................ 474/213; 474/214
(58) Field of Search ................................ 474/213, 212, 474/214, 140, 155, 156, 157, 215, 216, 84, 85, 86, 87, 152, 153, 150, 148, 206, 202

(56) References Cited

U.S. PATENT DOCUMENTS

| | | |
|---|---|---|
| 515,004 A | 2/1894 | Loomis |
| 525,254 A | 8/1894 | Brown |
| 554,181 A | 2/1896 | Hall |
| 582,024 A | 5/1897 | Rimmington et al. |
| 591,270 A | 10/1897 | Gauthier |
| 690,318 A | 12/1901 | Renold |
| 828,200 A | 8/1906 | Dodge |
| 1,388,506 A | 8/1921 | Belcher |
| 1,560,647 A | * 11/1925 | Belcher ................... 474/214 X |
| 1,956,942 A | * 5/1934 | Belcher et al. ............. 474/213 |
| 2,602,344 A | 7/1952 | Bremer |
| 2,718,153 A | 9/1955 | Dean |
| 3,656,361 A | 4/1972 | Honda |
| 4,509,937 A | * 4/1985 | Ledvina et al. ............. 474/213 |
| 4,758,209 A | 7/1988 | Ledvina |
| 4,758,210 A | 7/1988 | Ledvina |
| 4,759,740 A | 7/1988 | Cradduck |
| 4,915,675 A | 4/1990 | Avramidis |
| 5,551,925 A | * 9/1996 | Mott et al. .................... 474/85 |
| 5,588,926 A | 12/1996 | Mott et al. |
| 5,779,582 A | 7/1998 | Mott et al. |

FOREIGN PATENT DOCUMENTS

| | | |
|---|---|---|
| DE | 198 09 853 | 9/1998 |
| EP | 0833077 | 4/1998 |
| GB | 3761 | * 2/1900 |
| GB | 2326212 | 12/1998 |

* cited by examiner

Primary Examiner—David A. Bucci
Assistant Examiner—Marcus Charles
(74) Attorney, Agent, or Firm—McAndrews, Held & Malloy, Ltd.; Greg Dziegielewski

(57) ABSTRACT

Inverted tooth chains particularly those used in timing drive applications. Conventional guide links are replaced by conventional sprocket engaging links for the two outermost links in the outer link rows. A thick inner link of approximately twice normal thickness is placed in the inner link row and two normal thickness regular links are placed in the outer link row. Pins are fit securely in the holes of the links in the outer link rows.

10 Claims, 3 Drawing Sheets

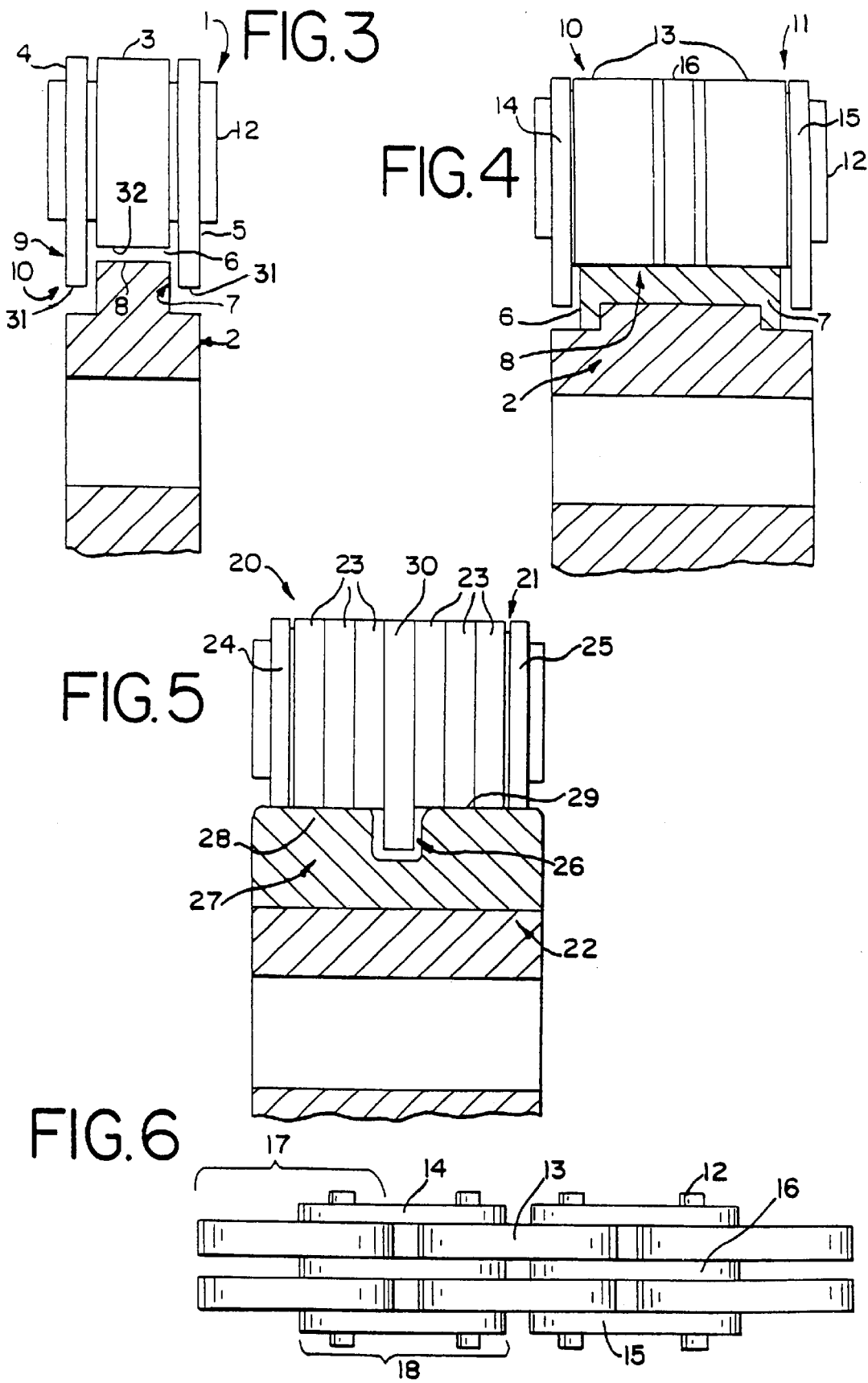

INTERIOR GUIDED CHAIN SYSTEM FOR LATERAL CHAIN CONTROL

This application claims benefit of provisional application U.S. Ser. No. 60/101,262, filed Sep. 21, 1998.

BACKGROUND OF THE INVENTION

In a typical inverted tooth chain used in transmission and timing drive applications there are inner link rows and outer link rows of links. The inner link rows will include one or more inverted tooth links that engage the sprocket teeth for the transmission of power. The outer link rows generally will include some conventional inverted tooth links similar to the ones used in the inner link rows and in the outermost position of the outer link rows there will usually be two outer or guide links that help guide the chain on the sprocket by engaging the sides or outer flanks of the sprocket. In some special cases the two guide links are replaced by a single centrally positioned guide link.

As chains become narrower, the space occupied by the two guide links becomes a significant portion of the total space occupied by the chain. To address this issue, certain chains have been devised that engage the sprocket with links of the inner link row only. The outer link rows of such chains generally only include two guide links. These chains are known as "block laced chains" because they most often include a number of identical sprocket engaging links positioned side by side thus forming a block of links. A modern day example of such a chain is Ledvina U.S. Pat. No. 4,758,210. However, such chains engage the sprockets in less than an optimum manner. Additionally, when conventional chains become narrow, the thickness of the sprocket tooth is further reduced, which creates potential strength concerns. The magnitude of the problem is increased further in instances where the cross section of the sprocket tooth is also decreased to improve the strength of the links.

Noise is associated with any chain drive. While noise is generated from any number of different sources it is the purpose of this invention to address noise generated from the conventional guide links contacting the sides of the sprocket teeth.

Another major problem associated with chains of conventional construction which include sprocket engaging inner links and guide links in the outer link rows is that the strength and elasticity of the conventional links and the guide links vary significantly. Attempts to address this issue via special guide link designs are exemplified by Avramidis U.S. Pat. No. 4,915,675 and Bremer U.S. Pat. No. 2,602,344. Whereas these methods have resulted in measurable improvements, results are better when these methods are applied in transmission chains in which the conventional links are stronger. With the weaker and less rigid links of timing chains and, particularly, the links of narrow timing chains, the results are less successful because the strength discrepancy between the sprocket engaging inner links and the guide links is substantial.

SUMMARY OF THE INVENTION

It is therefore the purpose of this invention to arrive at a chain embodiment that allows very narrow configurations without adversely affecting the optimum engagement between chain and sprocket, maintain acceptable sprocket tooth strength and eliminate any mismatches in strength and elasticity between links.

In the present invention, outer link rows are alternately interleaved with conventional inner link rows. The outer link rows are made and the objective of the invention achieved by eliminating conventional guide links in the outer link rows and then combining thick inner links in the inner link rows with thinner links in the outer link rows along with pins of any preferred configuration in a simple assembly. In the simplest embodiment, one thick link—about twice the normal link thickness—in the inner link row is interlaced with two standard thickness links in the outer link row. Round, oval, or rocking pins are fit securely into the two thin outer links securing the assembly, typically by press-fitting. The sprocket will be somewhat thicker than the total thickness of the thick link plus the two thin links.

In another embodiment, inner link rows and outer link rows are alternately interleaved. The outer link rows include a pair of outer links, having a standard thickness, which are press fit onto the ends of pins. The outer links have a pair of depending teeth joined by a crotch. The teeth of the outer links have a surface adapted to engage the teeth of a sprocket.

The outer link rows further include a standard thickness center link or inner link positioned between the outer links. The center link has the same form as a conventional inner link and is distinguished by being located in an outer link row. The center link is connected to the outer links by the pins or pivot members but need not be secured to the pins and is free to float, articulate or rotate with respect to the pins.

The inner link rows include a pair of inner links approximately twice the thickness of the outer links. Each inner link is positioned between an outer flank of the center or central link and an outer link. The inner links are connected by but not secured to the pins and thus, are free to articulate or rotate about the pins.

The elimination of the conventional chain guide links requires different means of maintaining the chain on the sprockets. It is therefore a further objective of this invention to develop other alternatives for the purpose of maintaining the chain on the sprockets. In one embodiment the sprockets are modified to include side flange surfaces to constrain the lateral movement of the chain.

In another embodiment it is possible to increase the height of the outermost links in the outer link row so as to guide the chain in a fixed position by having a member external to the chain protrude between the extended links. This is done by extending the top portion of the outer links a first vertical distance above the apertures of the outer links. The top portion of the inner links are extended above the apertures of the inner links a second vertical distance. The first distance (of the outer links) is made greater than the second distance (of the inner links in the inner link rows). Thus, the top portions of the outer links extend vertically more than the top portions of the inner links.

In another embodiment, the first distance (of the outer links) is made less than the second distance (of the inner links). Thus, the top portions of the outer links extend vertically less than the top portions of the inner links. In this case, the top extended portions of the inner links engage a groove formed in the guide member. Some of these embodiments will be described in more detail.

Other objects, features and advantages of the present invention will become apparent from the following detailed description when read in conjunction with the accompanying drawings.

BRIEF DESCRIPTION OF THE DRAWINGS

FIG. 3 is a cross sectional view of one embodiment of the interior guided chain system of the present invention illustrating the chain's extended outer guide links which create a channel for passage over the chain guide's raised center wear surface.

FIG. 4 is a cross sectional view of another embodiment of the interior guided chain system of the present invention illustrating a wider, i.e. higher capacity chain.

FIG. 5 is a cross sectional view of another embodiment of the interior guided chain system of the present invention illustrating the chain's extended center guide link traveling in a groove created in the chain guide's wear surface.

FIG. 6 is a top view of the chain system of FIG. 4.

DETAILED DESCRIPTION OF THE PREFERRED EMBODIMENTS

Figure 1:
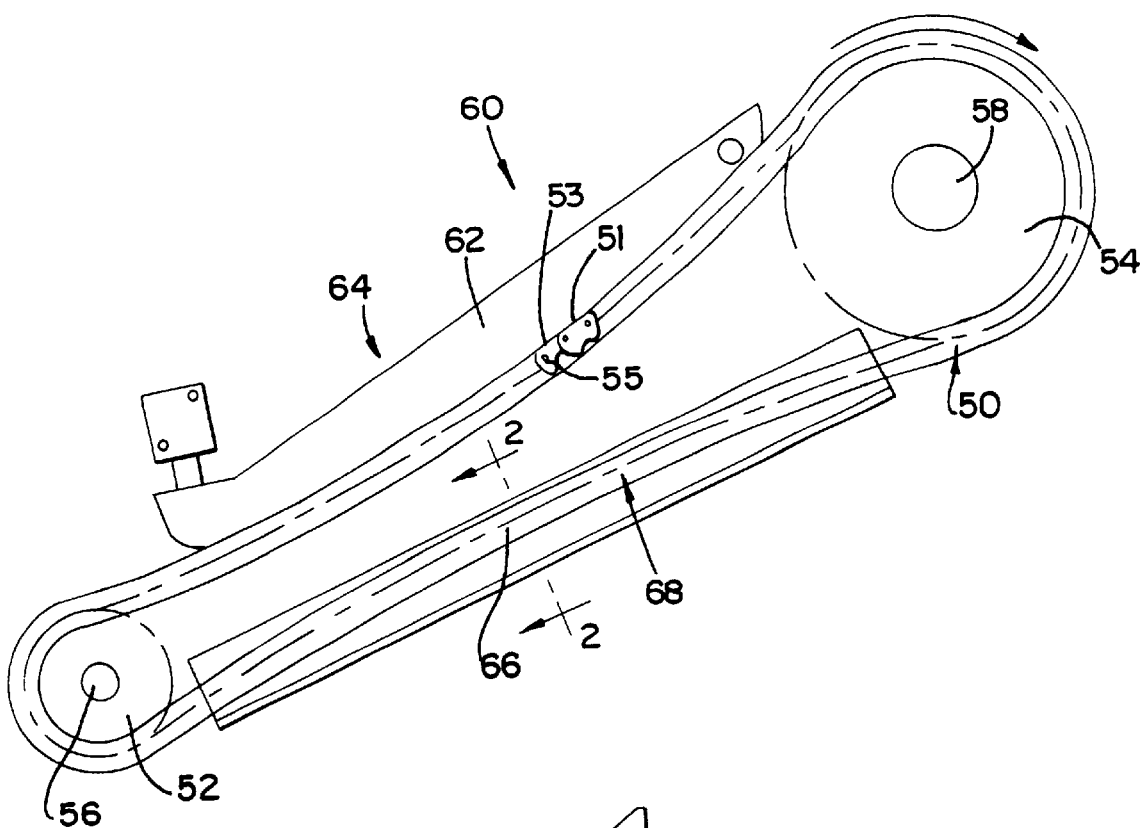
FIG. 1 is a side view of a conventional power transmission chain and guide system in an engine timing system between the crankshaft and one camshaft.
Figure 2:
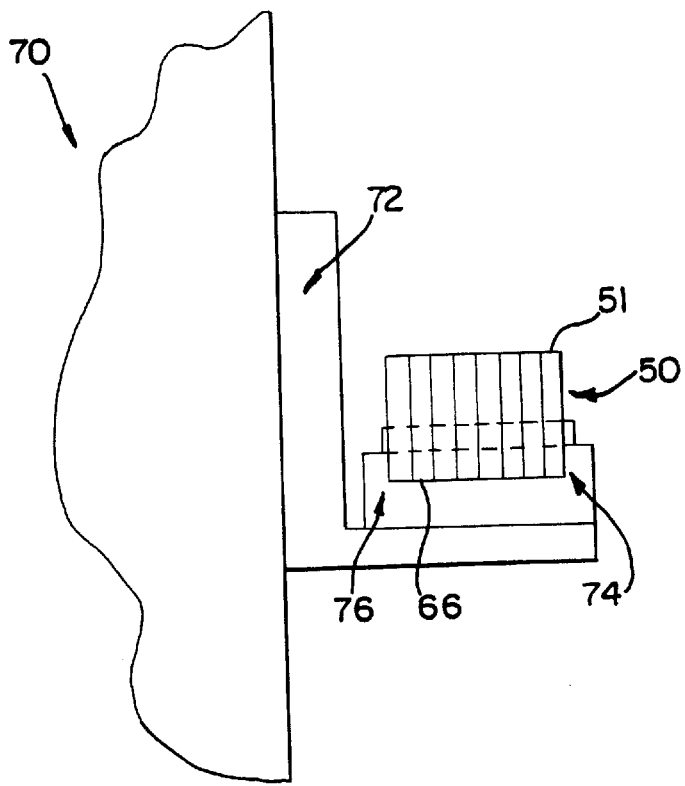
FIG. 2 is a cross-sectional view of the guide and chain of FIG. 1 illustrating the position of the guide and various links.

Turning now to the drawings, FIGS. 1 and 2 illustrate a conventional chain system and chain guide of the prior art. Chain 50 wraps around sprockets 52, 54, which are placed along crankshaft 56 and camshaft 58. A tensioner 60 is located along the slack side 62 of the chain 50. The tensioner includes an arm 64 pressed against the chain. A guide 66 is located on tight side 68 of the chain 50. The chain 50 is assembled using inner links 53 connected together by means of pins 55. The pins are secured to guide links 51.

The guide is shown in cross-section in FIG. 2. The guide 66 is mounted on engine block 70 by bracket 72. The guide sits on the bracket and has raised sides 74, 76 to guide the chain 50. The raised sides 74, 76, as a result of their contact with the guide links 51 of chain 50, limit the lateral travel of chain 50.

Figure 7:
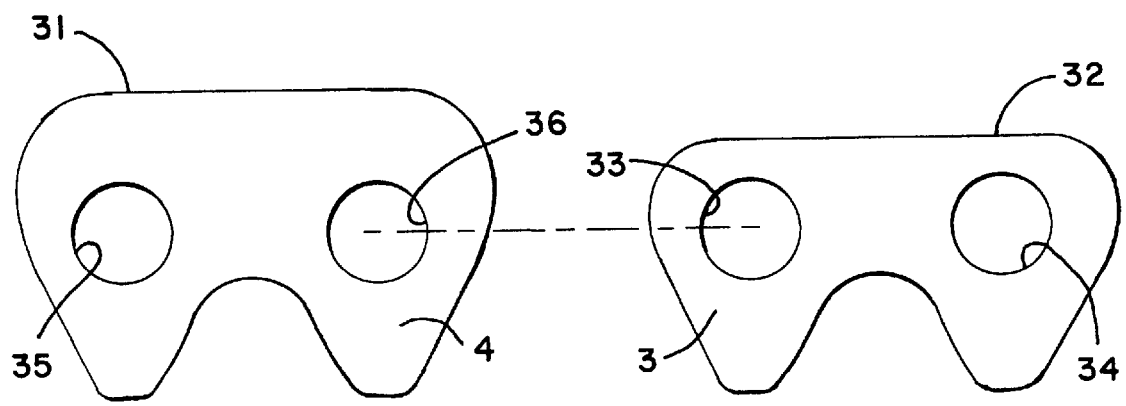
FIG. 7 is a side view of an inner link and an outer link of the silent chain of FIG. 3.

FIG. 3 illustrates a first embodiment of the invention. Chain 1 traveling over a chain guide 2 comprises only sprocket engaging links. Because the chain is assembled without exterior guide links to keep the chain operating on the sprockets the chain system relies on an interior guiding arrangement which encompasses a modification to the tensioning mechanism that is commonly used in timing drives. The interior guided chain system 10 of the present invention includes a chain 1 with extended outer links 4 and 5 which create a channel 6 for passage over the raised center wear face 7 of the chain guide 2. The chain 1 is comprised of a plurality of inner links 3, in addition to the outer links 4 and 5. As best shown by FIG. 7, both types of links, the inner or inside links 3 and the exterior or outer links 4, 5 include teeth for contacting the sprocket teeth for power transmission and two apertures 33 and 34 of link 3 and apertures 35 and 36 of links 4 and 5 through which a pin 12 extends.

As shown by FIGS. 3 and 7, top portions 31 of the outer links 4 and 5 are raised or extended a first vertical distance beyond the apertures 35 and 36 of the outer links. The top portions 32 of the inner links 3 are raised or extended a second vertical distance beyond the apertures 33 and 34 of the inner links. When the first distance is made greater than the second distance the greater extension of the top portions of the outer links 4 and 5 on the top side 9 of the chain 1 creates a channel 6 between the outer links 4 and 5. The raised wear face 7 of the chain guide 2 has a shape which nearly conforms to that of the channel 6 created on the top side 9 of the chain 1 between the extended outer links 4 and 5.

The chain system may include a tensioner arm, such as arm 64 shown in FIG. 1, or a snubber. Both the arm and snubber preferably include a raised center portion that conforms to the channel 6 created on the top side 9 of the chain.

In operation, when the chain guide 2 is positioned within the engine timing system, the channel 6 created between the extended outer links 4 and 5 on the chain 1 passes over the raised center wear face 7 of the chain guide 2. The top side 9 of the chain 1 runs along the bottom side 8 of the raised chain guide wear face 7. The creation of the channel 6 on the top side 9 of the chain 1 and the raised center wear face portion 7 on the chain guide 2 creates an interior guided chain system 10. This interior guided chain system 10 controls the lateral motion of the chain 1.

Figure 8:
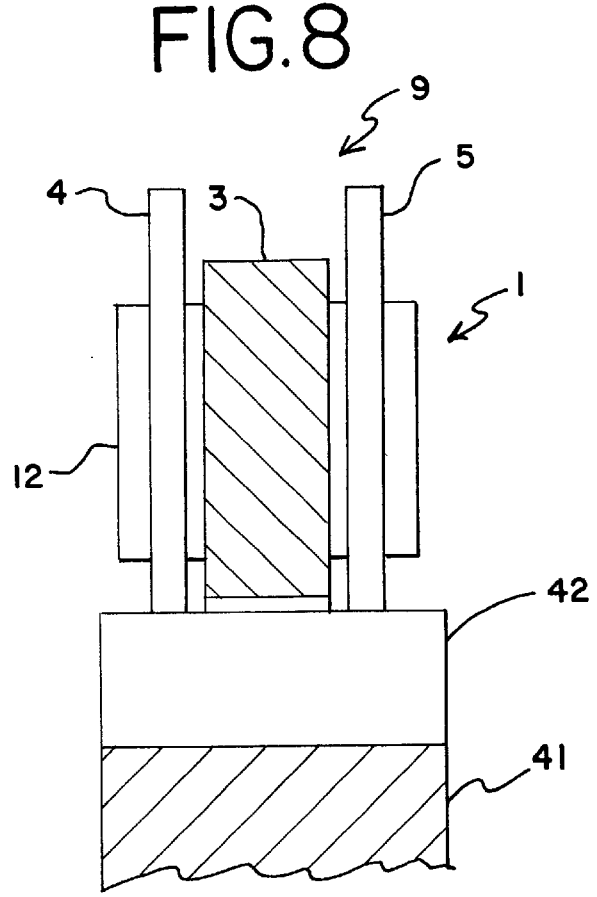
FIG. 8 is a front section view of the silent chain of FIG. 3 and a cutaway section of a sprocket.

Chain 1 of the aforementioned embodiment comprises one thick inner link 3 and two thinner outer links. Because the outer links 4, 5 are taller than the inner links 3 they are stronger so they can each be less than one half the thickness of inner link 3 and still have at least one half the strength of link 3 thus resulting in a balanced design. The securely fit pins 12 also improve the strength characteristics of the chain so the thin outer links contribute to the creation of a narrow chain of significant strength. The chain 1, as described above, does not include conventional guideplates and, as shown by FIG. 8, may engage a sprocket 41 having teeth 42 that are wider than the lateral width of the chain across outer links 4 and 5.

A higher strength version of the chain 11 of the present invention is disclosed in FIG. 4. Two links 13 of an appropriate thickness will be used in the inner link row and three thinner links 14, 15, 16 of the same sprocket engaging configuration will be used in the outer link row. One of the three thin links, center link 16 will be positioned between the two thick inner links 13. The other two thin outer links 14, 15 will be positioned outboard of the thick links.

Whatever pin configuration is selected, the pin 12 will be fit securely to the two outermost links. Whether the centrally positioned thin link 16 is securely or movably fit is a matter of choice. In this configuration, and in any other configuration involving more than one thick link in the inner link row, certain steps must be followed in selecting appropriate link thicknesses. After selecting the thickness of the thick link based on performance requirements, the thickness of the outermost thin links is obtained by dividing the sum of the thicknesses of the thick links by the number of thick links plus one. This will be the approximate thickness of the links of the outer link row. In the event that the central thin links are securely fit on the pin the thickness of the outer links must be somewhat reduced to maintain equality of strength and deformation characteristics within the outer link row. If the central links are not securely fit on the pins then the thickness of the central links should be even greater, i.e., approximately 20%.

FIG. 5 depicts an alternate embodiment of the interior guided chain system 20 of the present invention having a chain 21 with an extended center link 30 which travels within a groove 26 formed in the wear face 27 of the chain guide 22. The extended center link may be positioned within the inner link row or the outer link row. Whether the extended link is located in the inner link or the outer link row the fact that it is a stronger and stiffer link must be considered when the thickness of the remaining links of the row is determined. A similar approach to the one considered in the embodiment of FIG. 4 could be used in selecting appropriate thicknesses.

The chain 21 is comprised of a plurality of interior or inner links 23, outer links 24 and 25 and a center link 30 which is raised or extended beyond the height of the interior 23 and outer links 24 and 25. In this embodiment, the vertical distance from the aperture to the top portion of the outer links 24, 25 extends a first distance. The vertical distance from the aperture to the top portion of the center links 30 extends a second distance. When the first distance is made less than the second distance the extension of the top portion of the center link 30 is made greater than that of the outer links.

In the center of the chain guide wear face 27, a groove 26 is formed. The shape of the groove 26 formed in the center of the chain guide wear face 27 nearly conforms to the shape of the extended center guide link of chain 21. The chain guide 22 is positioned in the engine timing system so that the top side 29 of the chain 21 runs along the bottom side 28 of the chain guide wear face 27 and the extended center guide link 30 of the chain 21 travels within the groove 26 created in the chain guide wear face 27. By creating a groove 26 in the chain guide wear face 27 as a passageway for the extended center guide link 30 on the top side 29 of the chain 21, an interior guided chain system 20 is created.

This interior guided chain system 20 controls the lateral motion of the chain 21. The chain system may include a tensioner arm or snubber. In such a system, both the arm and the snubber preferably include a groove in the wear face to serve as a passageway for the center guide link. The interior guided chain system 10 and 20 of the present invention may be used with both single and dual overhead camshaft engine timing systems.

The chain guides 2 and 22, of the interior guided chain systems 10 and 20, respectively, of the present invention, are positioned on the tight side of the chain. Often the tight chain strand of chain experiences a resonance or lateral motion. This lateral motion is in the plane parallel to the crankshaft axis or lateral to the movement of the chain in FIGS. 3, 4 and 5. The interior guided chain system 10 and 20 of the present invention is designed to control this lateral motion of chains 1, 11 and 21. Additionally, the interior guided chain systems 10 and 20 of the present invention are effective in controlling all vibrational modes of the chain because the movement of the chain is controlled along the entire length of the chain guide.

FIG. 6 illustrates the top view of the interior guided chain system of FIG. 4. In particular, inner link row 17 is shown interleaved with outer link row 18. Each inner link row 17 has a pair of thick inner links 13 of an appropriate thickness. Each outer link row 18 is flanked by outer links 14, 15, each located outside thick inner links 13. The outer link row 18 contains a center link 16 located between the pair of inner links 13. The outer and center links 14, 15, 16 are thinner by about half than inner links 13. A plurality of pins 12 are used to interconnect the rows. The ends of the pins 12 have outer links secured thereto, typically by press-fitting. Both the inner links and center links are not secured to the pins and are free to rotate with respect to the pins.

The chain disclosed herein provides a number of other advantages. Misalignment of the mounted sprockets will not cause unnecessary twisting of the chain. Neither will misalignment result in scrubbing of the guide links against the sides of the sprockets generating noise and wear. Additionally sprocket thickness tolerances become less critical since they will not affect drive alignment. The sprocket teeth do not need to be chamfered at the sides to avoid interference with the incoming guide links.

Those skilled in the art to which the invention pertains may make modifications and other embodiments employing the principles of this invention without departing from its spirit or essential characteristics, particularly upon the foregoing teachings. The described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A silent chain assembly, comprising:

a silent chain having a plurality of interleaved inner and outer inverted tooth links, said links being assembled in alternating inner link rows and outer link rows, each of said inverted tooth links having a top portion and a pair of inverted teeth extending downward from said top portion, each of said inverted teeth having at least one surface adapted to drivingly contact the teeth of an associated sprocket, pivot members connecting adjacent inner link and outer link rows of inverted tooth links to permit articulation of said chain, each link having a pair of apertures for receiving said pivot members, a pair of outermost inverted tooth links in said outer link rows having said pivot members securely fit in said link apertures, said pivot members in said apertures of said links of said inner link rows being permitted to rotate with respect to said apertures, said outermost outer inverted tooth links being located outside said inner links in a lateral direction of said chain assembly, said top portions of said outermost outer inverted tooth links extending a first vertical distance above an imaginary line passing through the center of said apertures of said outermost outer links, said top portions of said inner links extending a second distance above an imaginary line passing through the center of said apertures of said inner links, said first distance being greater than said second distance.

2. The silent chain of claim 1, wherein some rows of said rows of links are formed of inner links only, and other rows of said rows of links are formed of outer most outer links and a center link.

3. The silent chain of claim 1 wherein each of said links has a thickness in the lateral direction of the chain, the sum total of the thicknesses of the links in the inner link rows being approximately equal to the sum total of the thicknesses of the links in the outer link rows.

4. The silent chain assembly of claim 1, further comprising a sprocket, wherein said sprocket has a plurality of spaced teeth constructed and arranged to contact said teeth of said chain, each of said sprocket teeth having a thickness in said lateral direction of said chain, each of said sprocket teeth having approximately the same thickness, said sprocket tooth thickness being greater than the sum of the thicknesses of the links in any row of said chain.

5. The silent chain of claim 2 wherein each of said links has a thickness in the lateral direction of the chain, each of said rows of inner link links includes a single link, said single link in said inner link rows having a thickness approximately twice the thickness of each of the links in said outer link rows.

6. The silent chain of claim 5 wherein a plurality of center links are positioned in the outer link row between said two outer most outer links.

7. A silent chain assembly and chain guide system, comprising:

a silent chain having a plurality of interleaved inner and outer inverted tooth links assembled in alternating inner link rows and outer link rows, each of said links having a top portion and a pair of inverted teeth extending downward from said top portion, each of said inverted teeth having at least one surface adapted to drivingly contact the teeth of an associated sprocket, pivot members connecting adjacent inner link rows and outer link rows to permit articulation of the chain, each link having a pair of apertures for receiving said pivot members, a pair of outermost inverted tooth links in said outer link rows having said pivot members securely fit in said link apertures, said pivot members in said apertures of said links of said inner link rows being permitted to rotate with respect to said apertures, said outer links being located outside said inner links in a lateral direction of said chain, said top portions of said outer links extending a first vertical distance above an imaginary line passing through the center of said apertures of said outer links, said top portions of said inner links extending a second distance above an imaginary line passing through the center of said apertures of said inner links, said first distance being greater than said second distance, a chain guide positioned adjacent to and along the top portion of said chain, said chain guide having a raised center portion, said raised center portion of said guide being located within a channel defined by said extended top portions of said outer links of chain, said chain guide acting to restrict movement of said chain in a lateral direction.

8. A silent chain assembly and chain guide system, comprising:

a silent chain having a plurality of interleaved inner and outer inverted tooth links, said links being assembled in alternating inner link rows and outer link rows, each of said links having a top portion and a pair of inverted teeth extending downward from said top portion, each of said inverted teeth having at least one surface adapted to drivingly contact the teeth of an associated sprocket, pivot members connecting adjacent inner link and outer link rows to permit articulation of the chain, each link having a pair of apertures for receiving said pivot members, a pair of outermost inverted tooth links in said outer link rows having said pivot members securely fit in said link apertures, said pivot members in said apertures of said links of said inner link rows being permitted to rotate with respect to said apertures, said outer links being located outside said inner links in a lateral direction of said chain, said top portions of said outer links extending a first vertical distance above an imaginary line passing through the center of said apertures of said outer links, said top portions of said inner links extending a second distance above an imaginary line passing through the center of said apertures of said inner links, said first distance being less than said second distance, a chain guide located along the top portion of said chain, said chain guide having a centrally located groove, said vertically extending top portion of said inner link being located within said groove, said chain guide acting to restrict movement of said chain in a lateral direction.

9. The chain and associated guide of claim 8 wherein said inner links with said vertically extending top portions are positioned in a plurality of inner link rows.

10. The chain and associated guide of claim 8 wherein said inner links with said vertically extending top portions are positioned in a plurality of outer link rows.

* * * * *